(12) United States Patent
Effing

(10) Patent No.: US 11,956,241 B2
(45) Date of Patent: Apr. 9, 2024

(54) WEB ACCESS CONTROL METHOD

(71) Applicant: Digital Tangible, S.L., Barcelona (ES)

(72) Inventor: Simon Effing, Berlin (DE)

(73) Assignee: Digital Tangible, S.L., Barcelona (ES)

( * ) Notice: Subject to any disclaimer, the term of this patent is extended or adjusted under 35 U.S.C. 154(b) by 313 days.

(21) Appl. No.: 17/283,992

(22) PCT Filed: Oct. 4, 2019

(86) PCT No.: PCT/EP2019/076982
§ 371 (c)(1),
(2) Date: Apr. 9, 2021

(87) PCT Pub. No.: WO2020/074401
PCT Pub. Date: Apr. 16, 2020

(65) Prior Publication Data
US 2021/0352072 A1    Nov. 11, 2021

Related U.S. Application Data

(60) Provisional application No. 62/744,310, filed on Oct. 11, 2018.

(51) Int. Cl.
*H04L 29/00* (2006.01)
*G06F 21/10* (2013.01)
(Continued)

(52) U.S. Cl.
CPC ............ *H04L 63/102* (2013.01); *G06F 21/10* (2013.01); *G06K 19/06037* (2013.01); *H04L 9/3213* (2013.01)

(58) Field of Classification Search
CPC ... H04L 63/102; H04L 9/3213; H04L 9/3228; G06F 21/10; G06K 19/06037
See application file for complete search history.

(56) References Cited

U.S. PATENT DOCUMENTS 9,479,615 B1 * 10/2016 Kleber .................... H04L 67/01
9,640,002 B1 *  5/2017 Grosberg ............ G07C 9/00174
(Continued)

FOREIGN PATENT DOCUMENTS

CN        106209862 A  * 12/2016  ......... H04L 63/1425
WO    WO 2020/074401         4/2020

OTHER PUBLICATIONS

International Search Report and the Written Opinion dated Jan. 27, 2020 From the International Searching Authority Re. Application No. PCT/EP2019/076982. (11 Pages).
(Continued)

*Primary Examiner* — Don G Zhao

(57) ABSTRACT

A method for web access control that comprises the following steps: creating a content item (1) in a content management system; generating a series of unique secure random access tokens (2) and storing them in a database (3); generating a file containing the ATs with their corresponding direct link URLs, when a client device accesses the content using a browser (11), checking with the server if the request's BID is already registered for this AT; if it is already registered, allowing access to the content; if not, checking if a preset limit of allowed registered BIDs for the AT has been reached; if the limit has been reached, denying access to the content; if not, registering the new BID with the AT and allowing access to the content.

18 Claims, 4 Drawing Sheets

(51) Int. Cl.
    *G06K 19/06*     (2006.01)
    *H04L 9/32*     (2006.01)
    *H04L 9/40*     (2022.01)

(56) References Cited

U.S. PATENT DOCUMENTS

| | | | | |
|---|---|---|---|---|
| 9,934,310 | B2* | 4/2018 | Fisk | G06F 16/95 |
| 10,044,729 | B1* | 8/2018 | Astakhova | H04W 12/08 |
| 10,089,650 | B1* | 10/2018 | McClintock | G06Q 30/0255 |
| 11,429,319 | B2* | 8/2022 | Ando | H04L 67/1097 |
| 2006/0036748 | A1* | 2/2006 | Nusbaum | G06F 16/9535 |
| | | | | 709/228 |
| 2007/0266310 | A1* | 11/2007 | Sasaki | G06F 3/002 |
| | | | | 709/203 |
| 2008/0115227 | A1* | 5/2008 | Toutonghi | G06F 21/10 |
| | | | | 726/29 |
| 2009/0251599 | A1* | 10/2009 | Kashyap | H04N 21/6582 |
| | | | | 348/E5.009 |
| 2013/0219458 | A1* | 8/2013 | Ramanathan | G06F 21/10 |
| | | | | 726/1 |
| 2013/0232563 | A1* | 9/2013 | Ache | H04N 7/17318 |
| | | | | 726/5 |
| 2014/0058792 | A1* | 2/2014 | Talker | G06Q 30/0641 |
| | | | | 705/7.29 |
| 2017/0076007 | A1* | 3/2017 | Knoll | G06Q 30/0255 |
| 2018/0077231 | A1* | 3/2018 | Machida | H04L 67/1008 |
| 2018/0173906 | A1* | 6/2018 | Rodriguez | G06Q 40/00 |
| 2018/0176017 | A1* | 6/2018 | Rodriguez | H04L 63/20 |
| 2018/0218145 | A1 | 8/2018 | Hussain et al. | |
| 2022/0134338 | A1* | 5/2022 | Chang | G01N 35/00 |
| | | | | 422/502 |
| 2022/0407702 | A1* | 12/2022 | Jakobsson | H04L 9/50 |
| 2023/0139323 | A1* | 5/2023 | Ishii | H04W 48/20 |
| | | | | 455/422.1 |

OTHER PUBLICATIONS

EBook Reader "Kindle Book License Limit Explained", The eBook Reader Blog, XP055658376, The Wayback Machine, p. 1-6, Last Updated Jan. 27, 2018.

Elster Pantalony "Managing Intellectual Property for Museums", WIPO, World Intellectual Property Organization, Guide, 2013 Edition, p. 1-72, 2013.

* cited by examiner

WEB ACCESS CONTROL METHOD

RELATED APPLICATIONS

This application is a National Phase of PCT Patent Application No. PCT/EP2019/076982 having International filing date of Oct. 4, 2019, which claims the benefit of priority under 35 USC § 119(e) of U.S. Provisional Patent Application No. 62/744,310 filed on Oct. 11, 2018. The contents of the above applications are all incorporated by reference as if fully set forth herein in their entirety.

FIELD AND BACKGROUND OF THE INVENTION

The invention, as stated in the title of the present specification, relates to a method for accessing content placed in a content management system, e.g., a web, that ensures that the content is accessed by the allowed number of users without requiring the introduction and sharing of passwords, nor the supervision of an administrator of the web.

For instance, it can be used to allow any number of users to download, stream o play an audio guide to a museum, to obtain extra content when buying tickets to a concert, etc. Those users will keep their identity and personal data private and will not share it.

Several ways to protect a web-app to be freely accessed have been developed. The most common system is a registration with an email-address and a password followed by logins every time the user wants to access the same content again. Sometimes digital content and data hosted on a website get an additional protection against password-theft by the so-called two-factor-authentication, that adds an additional token to the login process via a code received on the mobile phone-number of the user or a Time-based One-time Password Algorithm (TOTP). Sometimes the registration makes sure that the person seeking access is human and not a bot by adding a so-called "captcha", that consists of a small action that theoretically con not be fulfilled by a robot to demonstrate that the person seeking access is human.

This kind of content protection serves mostly two purposes: privacy, since they prevent certain data from being publicly accessible against the will of the owner, security, making sure that no bot and no illegitimate user gets access, but also the protection of intellectual property. Some digital newspapers, for instance, require a registration and a login system to prevent nonsubscribers to read a content that should only be made accessible to subscribers.

This system (password-login, sometimes with a two-factor authentication and a captcha) are the common state-of-the art and provide an acceptable grade of security, but at the cost of requiring personal data from the user (like an email-address) and of the trouble generated by having to find a way to memorize or to store securely several passwords and losing time solving captchas. Although this trouble and privacy issues are accepted by the user when its purpose is to secure his own content, like bank-accounts or private information contained in social networks, it is often upsetting when its only purpose is to generate an artificial barrier to prevent non-authorized people to access intellectually protected content.

Traditional registration and login systems are annoying, slow down the access to the digital content on a protected web-app and violate privacy by requiring giving away personal data like name and/or email and/or a mobile phone-number.

It is known from U.S. Pat. No. 7,950,065 a method and a system to control access to content stored on a web server. It creates an encrypted link. When the authorized user accesses the content with the link, the client system is registered so the content is only shown to this system.

Thus, the need arises to find a simpler and more immediate way to protect access to content and to limit to a minimum the invasion of the user's privacy, like is provided by the light-weight web access control, subject of this invention.

On the other hand, and as a reference to the current state of the art, it should be noted that, as far as the applicant is concerned, they are not aware of the existence of any other application having the same or similar technical characteristics to those claimed herein.

SUMMARY OF THE INVENTION

The following is intended to be a brief summary of the invention and is not intended to limit the scope of the invention.

The light-weight method for web access control (LWAC) of the invention uses a combination of unique secure random access-tokens or codes (AT) and a browser ID (BID). The ATs may be printed on a physical surface (e.g., plastic or cardboard card) so they have to be entered into a web form. Additionally, a direct link including the AT may be encoded in a QR code that would be also printed on a physical surface. The BID is a secure unique random generated on the fly when a browser accesses the web-app for the first time and is stored in a cookie. Each AT allows only a limited number of BIDs. An optional email-opt-in can allow additional access.

The combination of the three mentioned elements allows a fast and convenient access to a protected content without compromising the privacy or convenience of the user.

The Light-Weight Web Access Control (LWAC) method allows any user a fast, anonymous, direct and secure access to a web-app without having to register, to login or to give away personal data. The user can access the content as often as desired by entering or scanning again the access token (AT) that has been printed on a physical surface, like a card or brochure, that the user can keep and reuse an indefinite number of times. But thanks to the unique access tokens (AT) and the browser ID (BID) registration, the access cannot be transferred and therefore keeps its commercial value.

Description of the benefits of this invention to its users:

By protecting digital content on a web-app with a light-weight method of web access control, museums or tour-operators could allow a controlled access to a digital audio guide by keeping their commercial value and being able to sell them; newspapers could tie their subscriptions to a device and avoid the piracy produced by misusing the subscriptor's login-data; publishers could sell e-books, audiobooks or other digital publications on a physical way in brick-and-mortar stores; musicians could use this method to protect their music and to sell it in concerts by printing the access tokens (AT) on a physical surface without having to use expensive and environmentally unfriendly CDs.

By using the light-weight web access control (LWAC) method to access digital content on a web-app, users could free themselves from the hassle and privacy-concerns of entering personal data on a registration; they could have a much faster and immediate access to the digital content on a web-app; they could access the content several times by keeping the physical surface, like a plastic or cardboard card or a brochure, where the access token (AT) have been printed.

The light-weight method for web access control comprises the use of a combination of a unique secure random access-token (AT) and a browser ID (BID) using the following steps:

First it creates a content item, or more, in a content management system.

Then it generates a series of unique secure random access tokens and stores them in a database.

It also generates a file with the appropriate format (e.g., CSV) which comprises the serial number, the ATs and a direct link URL (including the AT) to the content.

As such, when a client device accesses the content with the direct link URL using a browser, the server checks if the request's BID is already registered for this AT.

If the request's BID is already registered, it allows access to the content.

If the request's BID is no registered, then the server checks whether a preset limit of allowed registered BIDs for the AT has been reached. If not, the request's BID is registered and the access to the content is granted. If the preset limit has already been reached, access is denied although an opt-in procedure may be initialized.

The code for direct access may be printed on a physical medium, e.g., using a QR code or similar.

In a preferred embodiment, the server checks the browser accessing the web-app for the content for a browser ID (BID) cookie before checking with the server if the request's BID is already registered for this AT. If the cookie does not exist, a new secure unique random number is generated and set as the BID cookie. The BIDs may be cryptographically signed by the server to prevent spoofing. This new secure unique random number might get registered with the requested AT later in the database. Alternatively, for some type of requests (e.g., a non-initial request), if the cookie does not exist, access is denied.

The opt-in procedure allows access to the content from other devices or to regain access after cookies have been deleted.

In a preferred embodiment, the BID registrations are marked with a timestamp and have a limited lifetime. This lifetime may be preset or correspond to the time of an upgrade to the content.

The invention also refers to a server configured to evaluate a request of a client device for access to created content characterized in that it uses a combination of a unique secure random access-token (AT) and a client-device browser ID (BID). The server checks if the request's BID is already registered for this AT:

If it is already registered, allowing access to the content.

If it is not already registered, checking if a preset limit of allowed registered BIDs for the AT has been reached;
If the limit has been reached, denying access to the content;
If the limit has not been reached, register the new BID with the AT and allowing access to the content.

The system configured to carry out the method comprises a Web application configured to manage browser IDs (BIDs) by means of cookies and register these BIDs with access tokens (ATs), so that each AT can be used only by a limited number of BIDs.

The codes can be printed on a physical surface or medium, like a plastic or cardboard card or a brochure. It includes at least a QR code, or an alphanumeric code that allows such access, on at least one of its faces.

BRIEF DESCRIPTION OF THE SEVERAL VIEWS OF THE DRAWINGS

As a complement to the description provided herein, and for the purpose of helping to make the characteristics of the invention more readily understandable, the present specification is accompanied by a set of drawings constituting an integral part of the same, which, by way of illustration and not limitation, represent the following.

DESCRIPTION OF SPECIFIC EMBODIMENTS OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention and the claims. The present disclosure is to be considered as an exemplification of the invention. It is not intended to limit the invention to the specific embodiments illustrated by the figures or description below.

The present invention will now be described by referencing the appended figures representing preferred embodiments.

Figure 1:
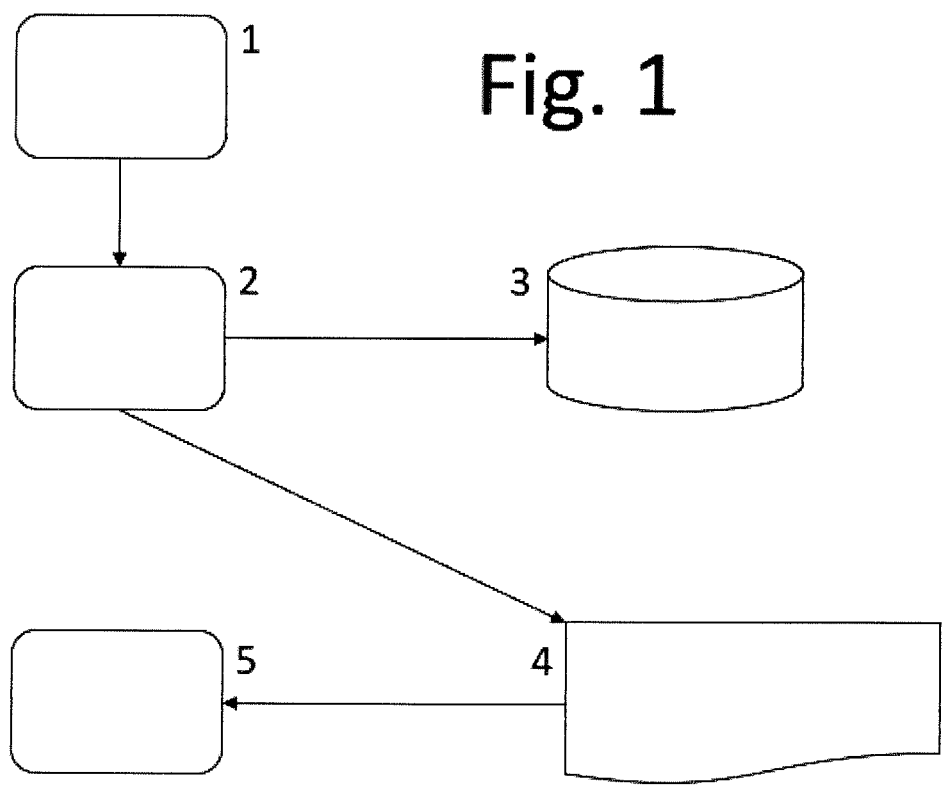
FIG. 1: Shows the steps of creation of access tokens according to one embodiment.

The method starts with the steps shown in FIG. 1. After creating a content item (1) in a CMS or content management system, a series of unique secure random access tokens (AT) are generated (2). These ATs are stored in a database (3) which keeps track of each AT's usage. The ATs can be downloaded (4) in CSV format which contains the serial number, the AT in alphanumeric format and a direct link URL to the web-app that includes the AT. These URLs allow the generation of Quick-response (QR) codes for convenient direct access or another similar readable format. Alternatively, the AT can be entered in a web-app form. The ATs and QR codes can be either provided digitally or printed on a physical surface like a card or brochure (5).

Figure 2:
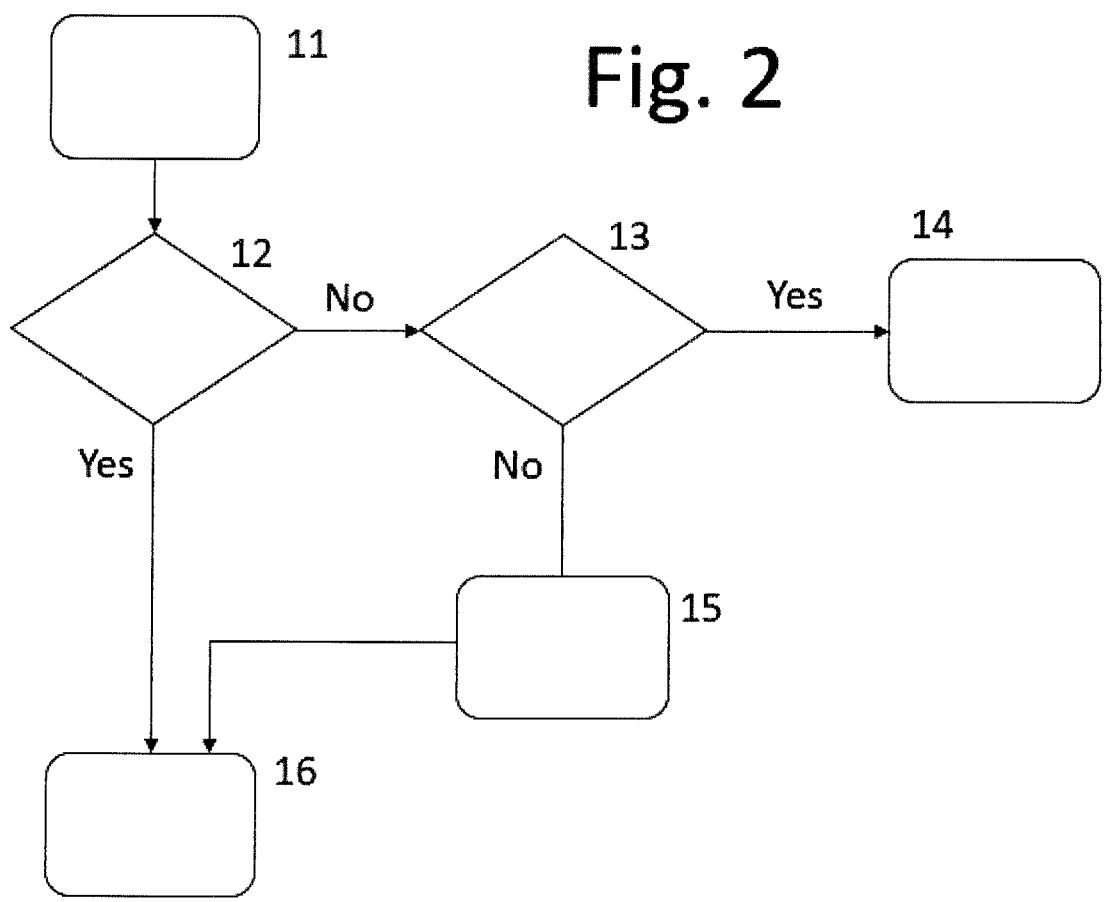
FIG. 2: Shows how to assign a browser ID to the content according to one embodiment.

The next steps are shown in FIG. 2. Each browser (11) accessing the web-app for the content is checked by the server for a browser ID (BID) cookie (12). If none exists, a new secure unique random number is generated (15) and set as the BID cookie. In either case, the request (22) for content is passed on for further processing (16). Optionally some requests (22) might require a previously existing cookie (13) and result in a rejection (14) of the request if none exists.

Figure 3:
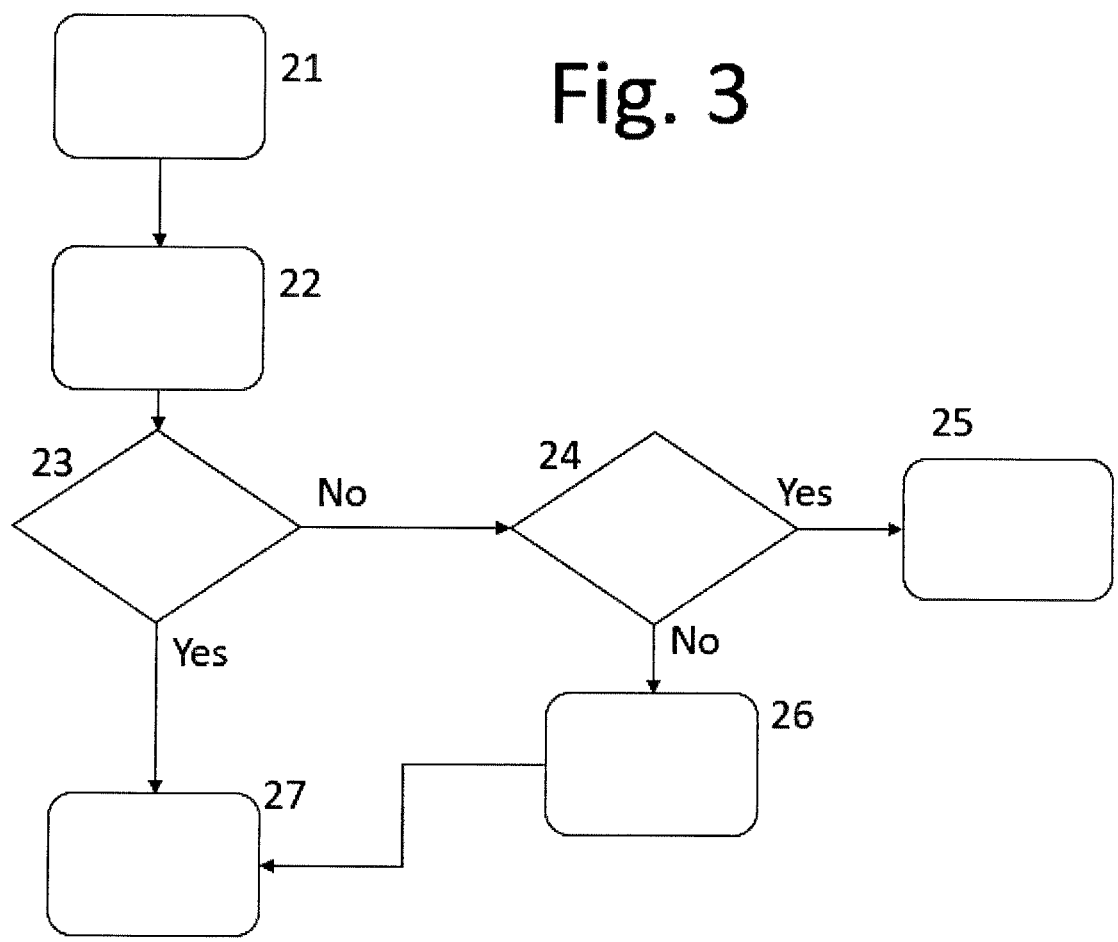
FIG. 3: Direct access with browser ID registration according to one embodiment.

In FIG. 3 it is shown the steps as the user ask for the content (21) by scanning de QR, entering the AT in the webform or similar procedures. The web-app receives the request (22) to the content. It is then checked (23) whether the request's BID is already registered with the AT or not. If it does, access to the content is granted (27). Otherwise, the systems checks if the limit of allowed registered BIDs for this AT is reached in a confirmation step (24):
- If the limit has not been reached, an additional BID is registered with the AT (26) and access to the content is granted (27).
- If the limit has been reached, access is denied and it results in a rejection (14). The user might be offered an email-opt-in-fallback (25). The number of BIDs allowed may be one, several . . . and will usually be defined when creating the content or setting up the method.

Figure 4:
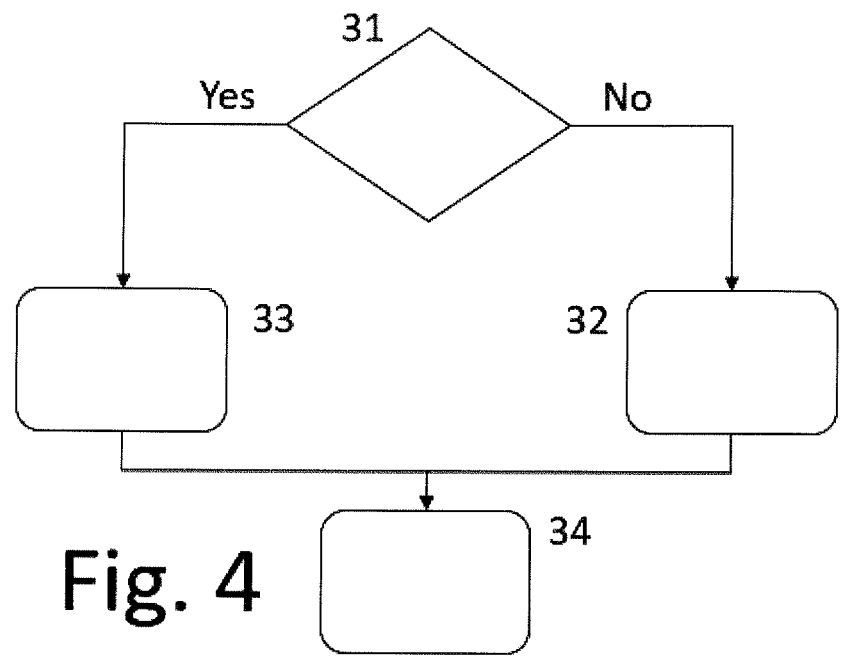
FIG. 4: First steps of an email-opt-in or fallback according to one embodiment.
Figure 5:
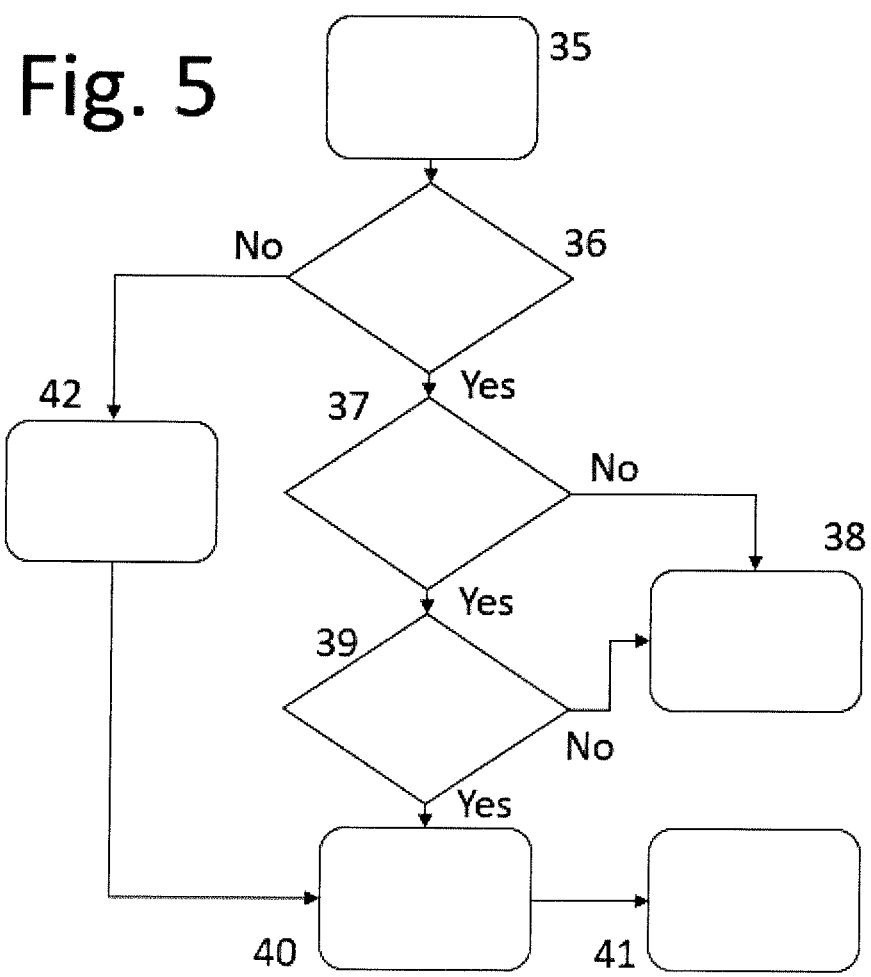
FIG. 5: Last steps of an email token fallback according to one embodiment.

In FIGS. 4 and 5 the email-opt-in procedure is shown. It allows for accessing the content from other devices or to regain access after cookies have been deleted. It starts with the check if there is already a user's email registered with the AT (31). If an email registration exists, the user is asked if a new email token link (ET link) should be sent to this email (33). It should be impossible to enter a different email to avoid misappropriation. Otherwise, the user is prompted to enter their email address (32). If approved, an ET is generated, and a link is sent to the corresponding email address (34).

If the user clicks on the new link, the web-app receives the new request (35). If the AT doesn't have a registered email (36), it proceeds with the registration of the ET's email (42) with the AT and the BID is registered with the ET. To allow later direct BID cookie access on the current client device, the requests BID is additionally registered with the AT (40) and access is granted (41).

If the AT already has a registered email (36), this email is checked against the ET's email (37). If not equal, the request is rejected (38). Otherwise, the requests BID is checked against the ET's registered BID (39) to ensure the ET can only be used from one device (38). If the BID is the same, the BID is additionally registered with the AT to allow later direct BID cookie access on the current client device (40) and access is granted (41).

This approach gives each AT two access options: directly via the first used device and via email with the registered email address.

The BID registrations may have a limited lifetime. When a BID is registered with an AT, the corresponding DB record may be marked with a timestamp. Subsequent BID access can be checked against this timestamp and rejected if expired.

Every AT series can limit access to one or more BIDs per AT. This allows, for instance, for direct access for groups.

The method may include a failure per IP address rate limiter, to protect against brute force attacks. This limiter also allows for shorter ATs, improving the user experience.

Some mobile QR-reader apps automatically send an HTTP request and then open a separate browser when scanning a web URL. As the first request already registers a BID using the QR-reader app identification, the subsequent browser request might be unduly rejected. To prevent this, an interstitial page with user interaction may be displayed so the BID is registered only when the user clicks on a button. This button could be used for e.g., language selection.

The invention claimed is:

1. A method for web access control, comprising performing, by a web server that is tangibly embodied, accessed via web by client devices and coupled to a non-volatile storage for retaining a database:
   receiving a request by a client device for access with a direct link URL using a browser;
   checking in a database of unique secure random access-tokens and corresponding direct link URLs if a browser ID of the request is already registered for an access-token (AT) to which the direct link URL corresponds;
      wherein in response to determining the browser ID is already registered, allowing access requested by the client device;
      wherein in response to determining the browser ID is not already registered, checking if a preset limit of allowed registered browser IDs for the AT has been reached;
         wherein in response to determining the preset limit has been reached, denying access requested by the client device;
         wherein in response to determining the preset limit has not been reached, registering the browser ID with the AT and allowing access requested by the client device; and
   preventing unduly denying access requested by the client device due to an automatically sent request by an application program other than the browser, by registering for a first time the browser ID in response to user interaction with content provided via an interstitial page which the direct link URL guides to, and which differs from a web page containing a content item that the client device requesting access thereto.

2. The method according to claim 1, characterized in that a code for direct access encoding the direct link URL and AT is printed in a physical medium.

3. The method according to claim 2, characterized in that the code for direct access is a quick response code.

4. The method according to claim 1, characterized in that the browser is checked by the web server for a browser ID cookie before checking if the browser ID of the request is already registered for the AT and, in response to determining none exists, a new secure unique random number is generated and set as the browser ID cookie.

5. The method according to claim 1, characterized in that in response to determining the preset limit of allowed registered browser IDs for the AT has been reached an opt-in procedure is initialized.

6. The method according to claim 1, characterized in that the browser is checked by the web server for a browser ID cookie and, in response to determining none exists, access is denied.

7. The method according to claim 1, characterized in that browser ID registrations are marked with a timestamp and have a limited lifetime.

8. The method according to claim 1, characterized in that a failure per IP address rate limiter is used.

9. The method according to claim 1, wherein the application program automatically sending access request is a QR-reader app and the automatically sent request is associated with an identification of the QR-reader app as the browser ID.

10. A method for web access control, comprising:
generating and storing in a database a plurality of unique secure random access tokens and corresponding direct link URLs;
providing a web server that is tangibly embodied, accessed via web by client devices and coupled to a non-volatile storage for retaining the database, the web server being adapted for web access control by performing:
checking in the database if a browser ID of a request by a client device for access with a direct link URL using a browser is already registered for an access-token (AT) to which the direct link URL corresponds;
wherein in response to determining the browser ID is already registered, allowing access requested by the client device;
wherein in response to determining the browser ID is not already registered, checking if a preset limit of allowed registered browser IDs for the AT has been reached;
wherein in response to determining the preset limit has been reached, denying access requested by the client device;
wherein in response to determining the preset limit has not been reached, registering the browser ID with the AT and allowing access requested by the client device; and
preventing unduly denying access requested by the client device due to an automatically sent request by an application program other than the browser, by registering for a first time the browser ID in response to user interaction with content provided via an interstitial page which the direct link URL guides to, and which differs from a web page containing a content item that the client device requesting access thereto.

11. The method according to claim 10, characterized in that a code for direct access encoding the direct link URL and AT is printed in a physical medium.

12. The method according to claim 11, characterized in that the code for direct access is a quick response code.

13. The method according to claim 10, characterized in that the browser is checked by the web server for a browser ID cookie before checking if the browser ID of the request is already registered for the AT and, in response to determining none exists, a new secure unique random number is generated and set as the browser ID cookie.

14. The method according to claim 10, characterized in that in response to determining the preset limit of allowed registered browser IDs for the AT has been reached an opt-in procedure is initialized.

15. The method according to claim 10, characterized in that the browser is checked by the web server for a browser ID cookie and, in response to determining none exists, access is denied.

16. The method according to claim 10, characterized in that browser ID registrations are marked with a timestamp and have a limited lifetime.

17. The method according to claim 10, characterized in that a failure per IP address rate limiter is used.

18. The method according to claim 10, wherein the application program automatically sending access request is a QR-reader app and the automatically sent request is associated with an identification of the QR-reader app as the browser ID.

* * * * *